United States Patent [19]

Hansson

[11] Patent Number: 4,846,097
[45] Date of Patent: Jul. 11, 1989

[54] APPARATUS FOR PREPARING A COATED FOODSTUFF

[75] Inventor: Nils E. Hansson, Bjuv, Sweden

[73] Assignee: Nestec S.A., Vevey, Switzerland

[21] Appl. No.: 247,883

[22] Filed: Sep. 22, 1988

Related U.S. Application Data

[62] Division of Ser. No. 925,281, Oct. 30, 1986, Pat. No. 4,808,423.

[30] Foreign Application Priority Data

Jan. 22, 1986 [EP] European Pat. Off. ............ 86100821

[51] Int. Cl.$^4$ .......................... A21C 9/04; A21D 6/00
[52] U.S. Cl. ....................................... 118/16; 118/18; 118/24; 118/602
[58] Field of Search ...................... 118/16, 13, 18, 24, 118/602, 31, 110, 312

[56] References Cited

U.S. PATENT DOCUMENTS

| | | | |
|---|---|---|---|
| 943,284 | 12/1909 | Tietjens | 118/13 |
| 3,404,659 | 10/1968 | Croston | 118/24 |
| 3,547,075 | 12/1970 | Johnson | 118/16 |
| 3,703,382 | 11/1972 | Harkey | 118/16 |
| 3,870,013 | 3/1975 | Wagner | 118/24 |
| 3,885,519 | 5/1975 | Orlowski | 118/16 |
| 4,058,083 | 11/1977 | Miller | 118/16 |
| 4,210,074 | 7/1980 | Laughman | 118/24 |
| 4,333,415 | 6/1982 | Miller et al. | 118/24 |

Primary Examiner—Willard Hoag
Attorney, Agent, or Firm—Vogt & O'Donnell

[57] ABSTRACT

An apparatus for coating a foodstuff with particulate coating material includes conveyors and means for applying the particulate material. A first conveyor has a horizontal upper run and a second conveyor has an upper run which includes an inclined portion positioned beneath the first conveyor which extends upwards towards the leading edge of the first conveyor and terminates in a horizontal upper run portion which extends to the leading edge of the second conveyor. Means are provided for applying particulate material onto another portion of the second conveyor prior to the inclined portion. The first conveyor transports pieces of a foodstuff to be coated to its leading edge whereat the foodstuff is deposited upon particulate material transported on the second conveyor, the pieces of foodstuff and particulate material then being further transported on the horizontal portion of the second conveyor to a position whereat means are provided for applying particulate material onto the foodstuff. The coated foodstuff is then further transported towards a third conveyor which is positioned such that its trailing edge is positioned a distance sufficient from the leading edge of the second conveyor for forming a space for allowing particulate material to fall through the space between the two conveyors and for receiving the coated foodstuff and transporting it from the second conveyor.

7 Claims, 1 Drawing Sheet

U.S. Patent     Jul. 11, 1989     4,846,097
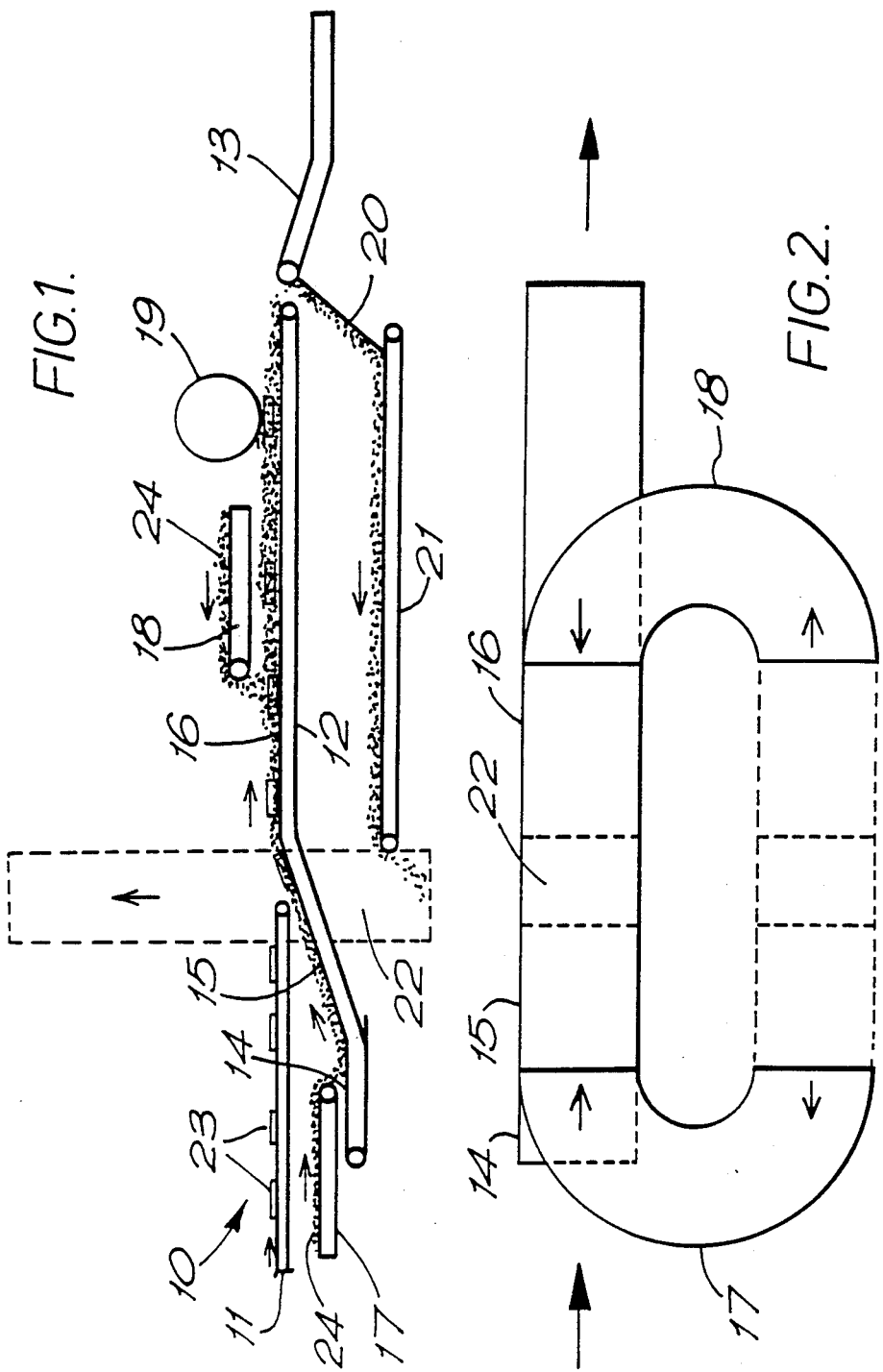

4,846,097

APPARATUS FOR PREPARING A COATED FOODSTUFF

CROSS REFERENCE TO RELATED APPLICATION

This is a divisional application of application Ser. No. 06/925,281, filed Oct. 30, 1986 now U.S. Pat. No. 4,808,423.

BACKGROUND OF THE INVENTION

The present invention relates to a novel coated foodstuff and more particularly to a foodstuff coated with a particulate material derived from fresh root vegetables.

In the preparation of frozen coated food products such as fish, meat or vegetables suitable for oven-cooking, the foodstuff is usually coated with batter, breaded, prefried, deep-frozen and then packaged. The breading material is normally a particulate material such as bread crumbs or shredded cheese, or it may be a particulate material derived from dehydrated potato, for example, potato flakes, potato powder or potato granules. The average size of the particles is such that they usually have an average diameter of from 0.1 to 2.0 mm and the maximum volume of a particle is not usually more than about 10 cubic millimeters. The amount of breading material used in conventional procedures is normally not more than 10% by weight based on the total weight of the product.

It would, however, be very desirable to use particulate material derived from fresh root vegetables, such as potatoes, not only from an organoleptic point of view but also because the final product would have a significantly lower fat content to products coated with conventional coating materials due to the lower uptake of oil by the fresh vegetable in the pre-frying process. However, all our attempts up to the present time to use such coating materials have not been successful because in conventional equipment the particles of fresh vegetable material tend to stick together to form agglomerates which complicate the mechanical transport and make it impossible to obtain a satisfactory even coating.

SUMMARY OF THE INVENTION

We have now developed a foodstuff coated with a particulate material derived from fresh root vegetables in which the particles do not stick together to form agglomerates and which are distributed evenly upon the foodstuff.

Accordingly, the present invention provides a frozen food product comprising a foodstuff coated with batter and a particulate material, which is prefried before being deepfrozen characterised in that the particulate material is derived from fresh root vegetables.

The foodstuff may be any foodstuff which may conventionally be coated with particulate material, for example, vegetables, meat or fish. The foodstuff is usually predusted and coated with the batter by conventional methods before the particulate material is applied. Any type of batter may be used and Tempura batter is particularly suitable.

Preferably the individual particles of the fresh root vegetables have a volume greater than 20 cubic millimeters, for example, from 30 to 250, preferably from 40 to 200 and especially from 50 to 150 cubic millimeters. Root vegetables which are of particular interest are those which may be cut into relatively firm, substantially uniform pieces, for example, potatoes, carrots, turnips or swedes. Especially suitable materials are potato cubes or potato strips.

Advantageously, the amount of particulate material applied to the foodstuff is between 10 and 70%, more preferably from 15 to 50% and especially from 20 to 40% by weight based on the total weight of the prefried frozen food product. It should be understood that water is lost from the fresh vegetable material during the prefrying step and therefore the final product will contain less vegetable material by weigh than the amount applied.

Preferably, the particles of fresh root vegetables are coated with a predusting flour before application to the foodstuff. The amount of predusting flour depends on the size of the particulate material and the quantity applied to the foodstuff and is usually from 4 to 12%, preferably from 5 to 10% and especially from 6 to 8% by weight based on the weight of the particulate material. Any conventional predusting material may be used and may be any free flowing flour or starch material, for example, granulated potato or potato starch. The coating of the particulate material with a predusting flour is especially advantageous when the individual particles have a volume greater than 20 cubic millimeters.

The product has a significantly lower fat content when compared with pre-fried frozen products coated with conventional "breading" materials and reheats extremely well either by frying or by oven-heating.

The present invention further provides a process for preparing a frozen food product which comprises coating a foodstuff firstly with batter and then with a particulate material, and afterwards prefrying and deep-freezing, characterised in that the particulate material is derived from fresh root vegetables.

The foodstuffs and the particulate materials are as described hereinbefore and preferably the particulate material is coated with a predusting flour before application to the foodstuff in the amounts indicated above, for instance, by means of an ordinary dry mixer or rotating drum.

The present invention also provides an apparatus for coating a foodstuff with a particulate material derived from fresh root vegetables characterised in that it comprises a horizontal conveyor for a foodstuff, means for applying the foodstuff to the horizontal conveyor, a first means for applying a particulate material onto the foodstuff, a second means for applying particulate material onto at least part of the horizontal conveyor before the foodstuff has reached that part of the horizontal conveyor and means for transporting excess particulate material which falls off the horizontal conveyor upwardly on an inclined conveyor for redistribution to the first and second applying means for reuse.

Preferably, the horizontal conveyor for the foodstuff comprises at least two endless conveyor belts having horizontal upper runs arranged successively whereby the upper run of the second belt has a portion positioned below the first belt and which travels upwards and forwards to form a horizontal portion level with the horizontal upper run of the other endless conveyor belt.

The first means for applying the particulate material onto the foodstuff may, if desired, be provided by a hopper positioned above the first belt of the horizontal conveyor for the foodstuff and distribute the particulate material onto the foodstuff, preferably through a vibrator. In this case, the second means for applying particulate material onto the horizontal conveyor before a foodstuff has reached that part of the conveyor may conveniently be achieved by the excess particulate material falling off the forward end of the first belt onto the portion of the upper run of the second belt positioned below the first belt, so that it travels upwards and forwards onto the horizontal portion of the second belt. However, it is preferred that the first means for applying the particulate material onto the foodstuff is provided by a horizontal conveyor positioned above the horizontal upper run of the second belt of the horizontal conveyor for the foodstuff in which position the foodstuff is already lying on particulate material applied by the second means. In this case, the second means for applying particulate material onto the horizontal conveyor before a foodstuff has reached that part of the conveyor may conveniently be achieved by means of another horizontal conveyor positioned between the first belt and the portion of the second belt positioned below the first belt of the horizontal conveyor for the foodstuff, the particulate material being fed from the leading edge onto the portion of the second belt below the first belt from where it is transported forwards and upwards to the horizontal upper run of the second belt.

Although the excess particulate material which falls off the second belt may fall directly onto the inclined conveyor for redistribution, conveniently a further horizontal conveyor belt is positioned below the horizontal portion of the second belt of the conveyor for the foodstuff, for collecting excess particulate material which falls off this second belt and transporting it to the inclined conveyor from where it is distributed to the first and second applying means for reuse.

The present invention also provides a method for coating a foodstuff with a particulate material derived from fresh root vegetables characterised in that foodstuff is fed onto a horizontal conveyor, particulate material derived from fresh root vegetables is coated with a predusting flour and fed onto the foodstuff, further coated particulate material is fed onto at least part of the horizontal conveyor for the foodstuff before the foodstuff has reached that part of the horizontal conveyor, and excess particulate material falls off the horizontal conveyor and is transported upwards on an inclined conveyor to be redistributed and reused.

The presence of the predusting flour coated on the surface of the particulate material derived from fresh root vegetables helps to avoid the formation of agglomerates of the particles so that the transport is smooth and a satisfactory even coating is obtained The amounts of predusting flour are those indicated above. If the amount of predusting flour is too low or too high, the mechanical circulation of the particulate material in the system will not work satisfactorily. If the amount is too low agglomerates of the particles are formed which complicates the mechanical transport, while if the amount is too high there will be excess "free" predust in the system which will stick to parts of the transport system such as the conveyor belt or rollers and will form layers which will be of certain bacteriological risk.

It is important that the temperature of the particulate material does not rise appreciably above freezing point during its circulation and it has been found that by tempering the particulate material to a temperature from $-1°$ C. to $-3°$ C., its temperature does not normally rise above about $+1°$ C. during the average holding time in the system of about 30 minutes.

The present invention will now be further illustrated by way of example with reference to the following drawings.

BRIEF DESCRIPTION OF THE DRAWINGS

FIG. 1 is a diagrammatic sectional side view of the apparatus and

FIG. 2 is a diagrammatic top plan view of the apparatus.

DESCRIPTION OF PREFERRED EMBODIMENTS

Referring to the drawings, the apparatus generally designated 10, comprises a horizontal conveyor for transporting a foodstuff consisting of solid belts 11, 12 and 13 travelling in the direction of the arrows The upper run of solid belt 12 has a lower horizontal portion 14, an inclined portion 15 and an upper horizontal portion 16. Positioned between the solid belt 11 and lower horizontal portion 14 is a U-shaped endless conveyor belt 17, the upper run of which travels in the direction of the arrows. Positioned above the horizontal portion 16 is a further U-shaped endless conveyor belt 18 the upper run of which travels in the direction of the arrows, and a pressure roller 19. At the leading edge of the horizontal portion 16 is a chute 20 which leads to one end of a conveyor belt 21 at the other end of which is the lower end of an inclined oscillating conveyor belt 22 fitted with transverse ridges (not shown). At the top of conveyor belt 22 are a pair of chutes (not shown) one of each respectively leading to the rear edge of one of the U-shaped belts 17 and 18.

In operation, battered frozen fish portions 23, which had initially been deglazed with steam and predusted with grilled cracker meal 454 each weighing 50 g are fed from a freezer (not shown) onto solid belt 11. Fresh potato strips 24 having dimensions of 3 mm×3 mm×7 mm are coated with 7% by weight of granulated potato based on the weight of potato strips, tempered to $-2°$ C. and are fed continuously from a means (not shown) on to the U-shaped belt 17 to flow in the direction of the arrows until they fall off the leading edge onto the lower horizontal portion 14 to form a layer which is transported upwards along the inclined portion 15 to the upper horizontal portion 16 of belt 12. The battered frozen fish portions 23 are transferred from the upper run of belt 11 on to the upper horizontal portion 16 of belt 12 where they lie on the layer of potato strips. Further coated fresh potato strips 24 of the same dimensions are fed continuously from a means (not shown) on to the U-shaped belt 18 to flow in the direction of the arrow until they fall off the leading edge onto the fish portions on the upper horizontal portion 16 of belt 12. The fish portions coated with 35% by weight of potato strips based on the total weight are then transported under a pressure roller 19 and on to conveyor belt 13 which transports them to the fryer. Excess potato strips 24 fall off the leading edge of belt 12 onto the chute 20 where they are carried to conveyor belt 21 which transports them to the inclined conveyor belt 22. Here the fresh potato strips are transported upwards, the transverse ridges preventing the potato pieces sliding backwards, where they are distributed to two chutes one leading to the rear edge of U-belt 17 and the other leading to the rear edge of U-belt 18 on which they are transported for reuse. After frying, the completely coated fish portions are deep-frozen.

The final pre-fried product had the following composition:

Fish - 50%
Steam (as water) - 1%
Milled cracker meal 454 - 4%
Batter - 10%
Potato - 23%
Granulated potato - 2%
Oil - 10%

In this invention, the application to a foodstuff of a particulate coating material derived from fresh root vegetables in larger amounts and comprising particles of a larger size in comparison with conventional coated food products results in an entirely new product concept, with especially desirable organoleptic properties and a lower fat content, the production of which has hitherto not been possible. The products also have an interesting, attractive appearance quite different from conventionally coated products.

I claim:

1. An apparatus for coating a foodstuff with particulate material comprising:

a first conveyor having a horizontal upper run extending to a leading edge for transporting pieces of a foodstuff;

a second conveyor having an upper run including an inclined portion and a horizontal portion, the inclined portion being positioned beneath the first conveyor and extending upwards towards the leading edge of the first conveyor and terminating in the horizontal portion which extends to a second conveyor leading edge, the second conveyor being adapted for transporting particulate coating material and being positioned for receiving the pieces of the foodstuff from the leading edge of the first conveyor which are deposited upon the particulate material on the second conveyor for coating and transport with the particulate material;

means for applying particulate material onto another portion of the second conveyor prior to the inclined portion;

means for applying particulate material onto the pieces of the foodstuff transported on the horizontal portion of the second conveyor;

a third conveyor positioned at the second conveyor leading edge having a trailing edge positioned a distance sufficient from the second conveyor leading edge for forming a space for allowing particulate material to fall from the second conveyor leading edge through the space and for receiving coated foodstuff from the second conveyor leading edge for transporting coated foodstuff away from the second conveyor; and means including an upwardly inclined fourth conveyor for receiving and transporting particulate material falling through the space for distribution to each means for applying particulate material.

2. An apparatus according to claim 1 further comprising a roller positioned over the horizontal portion of the second conveyor between the means for applying particulate material and the second conveyor leading edge for pressure rolling the coated foodstuff.

3. An apparatus according to claim 1 wherein the means for receiving and transporting particulate material includes the fourth conveyor and a chute associated with the space between the second and third conveyors for receiving the falling particulate material from the space and a fifth conveyor for transporting the received particulate material to the fourth conveyor.

4. An apparatus according to claim 3 wherein the means for applying particulate material to the second conveyor is a U-shaped endless belt having a leading edge positioned over the second conveyor prior to the inclined portion of the second conveyor, the means for applying particulate material to the foodstuff on the horizontal portion of the second conveyor is a U-shaped endless belt and wherein chutes connect the fourth conveyor with the U-shaped belts for distribution of the particulate material to the belts.

5. An apparatus according to claim 1 wherein the means for applying particulate material to the second conveyor includes a sixth conveyor having a leading edge positioned over the second conveyor prior to the inclined portion of the second conveyor.

6. An apparatus according to claim 5 wherein the sixth conveyor and the means for applying particulate material to the foodstuff on the horizontal portion of the second conveyor are U-shaped endless belts.

7. An apparatus according to claim 6 wherein chutes connect the fourth conveyor with the U-shaped belts for distribution of the particulate material to the belts.

* * * * *